Patented Aug. 9, 1949

2,478,243

UNITED STATES PATENT OFFICE 2,478,243

PROCESS OF NITRATING OLEFINS

Clarence S. Coe, Long Beach, and Thomas F. Doumani, Los Angeles, Calif., assignors to Union Oil Company of California, Los Angeles, Calif., a corporation of California No Drawing. Application June 3, 1946, Serial No. 674,043

15 Claims. (Cl. 260—644)

The present invention relates to the nitration of olefins and diolefins of either acyclic or cyclic structure and to the preparation in this manner of compounds of new and unique structure. Thus, the invention discloses means for nitrating alkenes, cycloalkenes, alkadienes and cycloalkadienes which may or may not contain functional groups such as halogen, sulfonic acid, nitro, nitrile, acetylated amine, alcohol, ether or ketone groups. Thus, we contemplate the nitration of any of the compounds of the above types which possess an unsaturated carbon-carbon linkage.

It is a primary object of our invention to provide a means of preparing substituted nitromono-olefins and substituted nitrodiolefins. In this respect, it is important to emphasize the distinction between the substituted nitroolefin and the addition product of a nitrogen oxide and an olefin, which distinction resides in the fact that in the first of these; i. e., the substituted nitroolefins the double bond remains unaffected and the resulting nitro compound is of the same degree of unsaturation as the unsaturated hydrocarbon which was nitrated. On the other hand, the addition of a nitrogen oxide to an unsaturated hydrocarbon will affect the rupture of the double bond resulting in a saturated product.

It is thus evident that a further object of our invention is the preparation of nitroolefins and nitrodiolefins by means through which the addition of oxides of nitrogen to the double bond of the parent compound is minimized.

It is another and correlative object of our invention to prepare the aforementioned substituted nitro-mono- or diolefins substantially free of contaminating addition compounds.

It is yet another object of the present invention to accomplish the preparation of the substituted nitro unsaturated hydrocarbons in such a manner that polymerization and oxidation thereof is substantially completely avoided and the resultant product is predominantly monomeric in nature.

Still another object of our invention is to provide means for preparing a new series of compounds consisting of nitrodiolefins having a conjugated double bond.

It is also an object of the present invention to provide means for preparing a new series of compounds consisting of the nitroolefins in which the nitro group is attached to an unsaturated carbon atom. These compounds may be represented by the empirical formula

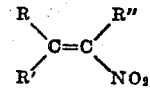

in which R, R' and R" may be hydrogen atoms or alkyl groups.

Correlative to the aforementioned objects it is a further object of our invention to provide means for preparing a large number of new compounds comprising the derivatives of the nitrodiolefins and nitromonoolefins, and particularly the addition compounds of the nitrodiolefins and nitromonoolefins with halogen, cyanide, thiocyanate groups, and the like.

An equally important object of our invention is to provide a method of preparing the aforementioned nitro compounds in a safe and economical manner.

Other objects and advantages of our invention will become apparent to those skilled in the art as the description thereof proceeds.

Briefly, we have found that the foregoing contemplated objects may be accomplished by nitrating the unsaturated hydrocarbons with nitric acid at atmospheric pressure and at comparatively low temperatures. The temperatures employed may vary to a considerable extent dependent upon the type of unsaturated hydrocarbon to be nitrated. Thus, it is desirable to perform the nitration of the diolefins at temperatures somewhat lower than those employed for the nitration of monoolefins. Similarly, we have found, that the temperature of nitration may vary with relation to the boiling range of the unsaturated hydrocarbons to be nitrated. Thus, the nitration of butenes and pentenes, butadiene and pentadiene, and the like, is preferably carried out at temperatures lower than those employed in the nitration of such unsaturated hydrocarbons as may be obtained, for example, from the petroleum waxes by methods hereinafter mentioned. In general we may employ for this liquid phase nitration temperatures ranging from as low as —40° C. to as high as +40° C. with those temperatures ranging from —40° C. to about 0° C. being preferred for the nitration of the comparatively lower boiling diolefins. With respect to the upper limit of this range it should not be above the boiling point of the diolefin to be nitrated at the pressure of nitration. Thus, in the nitration of butadiene, according to our invention the maximum temperature under which the nitration may be performed is approximately —5° C. when nitrating at atmospheric pressure. In the nitration of the monoolefins of comparatively low boiling point somewhat higher temperatures may be employed such as from about —40° C. to about +10° C., but here again it is necessary to employ temperatures less than the boiling point of the olefin to be nitrated at the particular nitrating pressure. Further, in the nitration of higher boiling unsaturated hydrocarbons such as those which may be obtained from petroleum fractions boiling above about 200° F., temperatures as high as about +30° C. to 40° C. may be employed for the nitration. These upper limits are particularly suitable for the processing of unsaturated hydrocarbons obtained by the chlorination and subsequent dehydrochlorination of the petroleum waxes.

To permit accurate temperature control and to prevent excessive rate of reaction and side reactions we prefer to add the nitric acid to the material to be nitrated at a comparatively slow rate. Here again the rate of addition may be affected by the comparative reactivity of the hydrocarbon to be nitrated with the diolefins and particularly the lower boiling diolefins being the most reactive, and therefore, being most readily nitrated by a slower addition of the nitric acid than is necessary to employ in the nitration of the monoolefins or the high boiling mono- or diolefins. The difference in rate of nitration between the diolefins and monoolefins may be taken advantage of to effect a separation between the two if such separation is desirable. Thus, by controlling the conditions of nitration the diolefins will nitrate substantially completely before any appreciable nitration of the monoolefins takes place. Therefore, if a mixed fraction is to be treated the nitrodiolefins may be removed from the mixture before proceeding with the nitration of the monoolefins.

The rates of addition of the nitric acid vary therefore, dependent upon the stock to be nitrated, from the total addition in the space of five minutes to one-half hour to an addition lasting some four or more hours. In general we may recommend that the addition of nitric acid to those olefins and diolefins boiling below about 200° F. be performed uniformly over a period of from 2 to 4 hours; whereas, the addition of nitric acid to the olefins of higher boiling point may be accomplished in less than two hours. It is to be understood that the above limitations are only illustrative of the preferred embodiment of the invention and are not to be construed as being exclusive operating conditions.

In many cases the nitration may be more smoothly accomplished by dissolving the unsaturated hydrocarbons to be nitrated in a solvent for such hydrocarbon. In choosing a solvent for this application it is preferable to employ a compound in which both the unsaturated hydrocarbon and nitric acid are soluble and which will not be attacked by the nitric acid. Such compounds for example as glacial acetic acid, the nitroparaffins or nitrocycloparaffins, or the like satisfy these requirements. Alternatively, in those cases where use of a solvent is indicated, a compound may be used in which only the unsaturated hydrocarbon is soluble without appreciably effecting the nitration reaction in any deleterious manner. Such compounds for example as the paraffinic and naphthenic hydrocarbons are excellent for this usage because of their ready availability. The use of a solvent is of particular importance when the hydrocarbon to be nitrated is a solid at the temperature of nitration and thus must be dissolved in a suitable solvent to render it susceptible to liquid phase reaction.

We prefer to employ a solvent which will aid in the reduction of the concentration of liberated nitrogen oxides so as to further insure a minimum of addition products in the nitrated unsaturated hydrocarbons. The removal of these nitrogen oxides as they are formed may be further insured by performing the nitration in a water emulsion whereby the nitrogen oxides, as formed, will be dissolved in the water forming nitric acid therein which will have the effect of supplementing the nitric acid destroyed in the nitration. Yet another method of insuring the removal of the undesirable nitrogen oxides comprises the addition to the reaction mixture of a compound to which such nitrogen oxides will add, forming thereby a water soluble compound or complex which will thus be automatically rejected from the reaction phase or which will so hold the nitrogen oxide as to prevent its addition to the unsaturated hydrocarbons undergoing nitration. Alternatively, we may introduce into the reaction mixture a solid adsorbent such as silica gel, diatomaceous earth, bauxite, and the like, to effect the selective adsorption of the nitrogen oxides as they are liberated in the nitration reaction. In general, we have found that those adsorbents which exhibit preferential adsorption for polar compounds are the preferred adsorbents for this usage.

The concentration of nitric acid which may be employed to effect the nitration may vary from as high as 100% to as low as about 60%. Although superatmospheric pressures and higher temperatures may be employed, there is, in most cases, no particular advantage therein and, in fact, such usage of higher pressures and temperatures may be deleterious to the efficiency of the reaction by inducing undesirable polymerization of the unsaturated hydrocarbons. However, the usage of superatmospheric pressures may be indicated under certain circumstances. This is particularly true in the nitration of such low boiling unsaturated compounds as ethylene and propylene wherein pressures may be utilized to maintain the reactants in liquid phase at the temperatures of nitration. Thus, in the lower temperature ranges of nitration, i. e., —40° C. ethylene and propylene will exist in the gaseous state at atmospheric pressures. However, with certain exceptions of this nature, it is preferable to avoid high temperatures and pressures. The molal ratio of unsaturated hydrocarbon to nitric acid may be widely varied, for example, ratios as low as 1 to 1 to as high as 20 to 1 of unsaturated hydrocarbon to nitric acid have been employed. For smoother reaction, it is preferred to employ the unsaturated hydrocarbon in excess of the nitric acid as for example, in ratios of from 2 to 1 to about 20 to 1.

The process of the present invention and the advantages thereof may be more readily appreciated by reference to the following specific examples:

EXAMPLE I

Three and one-half parts by weight of liquid butadiene was cooled to —30° C. in a reaction vessel equipped with a stirrer and means for continuously and slowly adding nitric acid thereto.

One part by weight of nitric acid of specific gravity 1.49 to 1.50 was added slowly to the vigorously stirred butadiene in the reaction vessel over a period of 4½ hours. The stirring was continued for an additional 50 minutes after which water was added to dilute any excess acid and the unreacted butadiene was allowed to evaporate at room temperature. The product from this reaction consisted of a light yellow-colored oil with a sweet odor, which oil contained 10.2% nitrogen. The physical properties of this material are tabulated below:

TABLE I

*Physical properties of nitro-butadiene of Example I*

| | |
|---|---|
| Boiling point, °C. at 760 mm. (capillary method) | 118–119 |
| Density at 20° C. | 1.029 |
| Refractive index, $N_D^{20}$ | 1.4211 |

The nitrogen content of the material prepared in this example indicates the presence of some impurity which, from the physical data, appears to be the dimer of butadiene.

The nitro-butadiene is a colorless, oily liquid possessing decided lachrymatory characteristics. It is apparently quite stable at normal conditions of temperature and pressure; adds bromine readily from glacial acetic acid, furnishing further proof of the presence of the double bonds; and is substantially insoluble in a 20% solution of sodium hydroxide.

This compound is illustrative of a whole series of homologous nitrodiolefins which may be prepared by the process of our invention. The location of the nitro group as being adjacent to the double bond is to be particularly noted. It is of course possible that in the preparation of the nitrodiolefins other isomers than the one described may be formed but as yet their presence has not been detected.

Compounds of this nature will readily add such functional groups as the halogens, cyanide, thiocyanates, and the like, by the opening of one or both of the double bonds. Similarly the nitro-monoolefins of the following empirical formula:

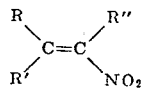

in which R, R' and R'' may be hydrogen atoms or alkyl groups, may form such addition compounds by the opening of the single double bond. Thus either class of compounds may be reacted to form dihalides, dicyanides, etc., or halocyanides, and the like. The nitrodiolefins may also be employed to synthesize tetrahalides, cyanides and thiocyanates or compounds containing mixtures of these substituting groups such as dihalo-dicyano-nitrodiolefins, and the like. Further, by chemical reduction the nitro group may be reduced to give an unsaturated amine of mono or diolefinic nature depending on the parent compound. Catalytic reduction is less satisfactory than chemical because of the large amount of hydrogenation of the double bond accompanying the reduction of the nitro group.

It is to be understood that the present invention contemplates not only the process of making nitroolefins and nitrodiolefins but also and as a natural expansion thereof the process of making the various derivatives of these compounds made possible by the provisions of a process for the preparation of the parent compounds. Other examples of the process of our invention will further serve to emphasize the benefits thereof.

EXAMPLE II

Ten parts by weight of commercial diisobutylene was cooled to 0° C. in a reaction vessel to which were added 2 parts by weight of nitric acid (specific gravity 1.49 to 1.50) over a period of 4 hours accompanied by vigorous stirring of the diisobutylene. The mixture was stirred continually for 6 hours during which time the temperature was maintained between 0° C. and 5° C. It is interesting to note that there were no brown fumes of $N_2O_4$ observed during this reaction. At the conclusion of the 6-hour reaction period ice water was added to dilute the unreacted nitric acid and the hydrocarbon layer was washed several times with distilled water. The unreacted diisobutylene was removed by fractionation and the residue was fractionated at 1 mm. pressure. From the reaction there was obtained 0.68 parts by weight of nitrodiisobutylene of light yellow color and possessing a pleasant odor.

EXAMPLE III

Wax olefins obtained from the chlorination and subsequent dihydrochlorination of petroleum waxes were nitrated with nitric acid it being found that the waxes and chloro waxes from which the olefins were derived were practically unaffected in the nitration process. The wax olefins employed for the nitration had the following properties: Molecular weight 300 (approximately); boiling point at 40 mm., 500° F. (approximately), total unsaturation, 1:22 double bonds per molecule, wax content 10% to 20%; iodine No. 103.

One hundred parts by weight of these olefins were cooled in an ice bath to the solidification point after which approximately 100 parts of 90% to 95% nitric acid was added over a period of about one-half hour. The reaction was quite vigorous and was maintained at a temperature somewhat less than 30° C. by immersion of the reaction vessel in an ice bath. Brown fumes of nitrogen oxides were evolved due presumably to the presence of an excess of nitric acid evidenced by the fact that the reaction appeared to cease prior to the addition of all the acid. The reaction product was diluted with ice water and washed repeatedly with water until the washings were neutral to litmus paper. The washed product was a reddish-orange liquid which solidified slightly below room temperature, was insoluble in water, and appeared to be only slightly soluble in concentrated sodium hydroxide solutions.

We have also found that dilute aqueous nitric acid solutions such as from about 10% to about 20% nitric acid react slowly with these wax olefins by refluxing the reaction mixture at its boiling point; however, the rate of reaction may be substantially increased by employing superatmospheric pressures and higher temperatures.

The substituted nitro unsaturated hydrocarbons or hydrocarbon derivatives prepared according to the process of our invention are extremely valuable compounds to be employed as chemical intermediates in the formation of synthetic resins, unsaturated amines, wetting agents, and the like; as Diesel fuel additives and fuels for jet-propulsion motors; and as insecticides. The derivatives such as the halo and cyano addition products are particularly effective as insecticides.

The foregoing examples show the procedure according to our invention as applied to the nitration of certain unsaturated hydrocarbons. It will be understood that these examples are only illustrative of the invention and are not intended to limit the scope thereof to the nitration of these particular hydrocarbons inasmuch as we have found that the process of the invention is applicable to the nitration of any unsaturated acyclic or cyclic hydrocarbon or derivatives of these hydrocarbons. Thus the unsaturated compound may comprise a compound in which any functional group has been substituted for a hydrogen atom. It is preferable to nitrate only those substituted compounds in which the functional group will not be attacked by the nitric acid. Included in this category are the halogen (Cl, Br, I, F,), sulfonic acid (—$SO_3H$), nitro (—$NO_2$), nitrile (CN), acetylated amine.

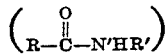

hydroxyl (OH), ketone

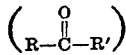

and ether R—(O—R') groups.

The improved procedure according to the invention constitutes a decided advance in the art inasmuch as it allows the efficient nitration of the compounds of the type mentioned, and avoids the complications that heretofore have entered into the procedures. The primary difficulty which has been overcome by our invention is that of effecting the nitration of unsaturated compounds by substitution without undue contamination with nitrogen oxide addition compounds.

The invention has been described in full in the foregoing specification. It will be understood, however, that many changes may be introduced in details of procedure, sequence of operations, compounds employed, and the like, without departure from the scope of the invention as set forth in the specification or as claimed in the following claims.

We claim:

1. As a new chemical compound mono-nitrobutadiene having a boiling point of 118–119° C. prepared by contacting butadiene with nitric acid having a concentration greater than about 90% by weight, said contacting being carried out in the liquid phase at a temperature in the range of about —40° C. to about +10° C. for a time sufficient to accomplish substitution of a nitro group for only a single hydrogen atom of said butadiene.

2. A process for preparing mononitroolefins which comprises slowly adding nitric acid having a concentration between about 90% and 100% by weight to at least an equimolal quantity of an olefin boiling below about 200° F. while maintaining the mixture at a temperature between about —40° C. and about +10° C.

3. A process according to claim 2 in which the temperature is maintained below the boiling point of said olefin but not above about 10° C.

4. A process according to claim 2 wherein the pressure is controlled so as to establish the boiling point of said olefin to be nitrated within the range of about —40° C. to about +10° C.

5. A process for preparing mononitrodiolefins which comprises slowly adding nitric acid having a concentration between about 90% and 100% by weight to at least an equimolal quantity of a diolefin boiling below about 200° F., while maintaining the mixture at a temperature between about —40° C. and about 0° C.

6. Mononitrobutadiene having a boiling point of about 118 to 119° C., prepared by slowly adding nitric acid having a concentration between about 90% and 100% to at least an equimolal quantity of liquid butadiene while maintaining the mixture at a temperature between about —40° C. and about 0° C.

7. A process according to claim 5 in which the temperature is maintained below the boiling point of said diolefin but not above about 0° C.

8. A process according to claim 5 wherein the pressure is controlled so as to establish the boiling point of said diolefin to be nitrated within the range of about —40° C. to about 0° C.

9. A process according to claim 5 in which the nitric acid is added to said diolefin at a substantially uniform rate throughout a period of from about 5 minutes to about 2 hours.

10. A process according to claim 5 in which the said diolefin is present in admixture with a monoolefin, and the diolefin is selectively nitrated.

11. A process according to claim 5 in which the diolefin is butadiene.

12. A process for substituting a nitro group for a hydrogen atom attached to a carbon atom which is in turn attached to another carbon atom by a double bond, which comprises contacting a hydrocarbon of the group consisting of monoolefins and diolefins containing such a hydrogen atom with nitric acid having a concentration greater that about 90% by weight, said contacting being carried out in the liquid phase at a temperature in the range of about —40° C. to about +10° C. for a time sufficient to accomplish said substitution of only a single hydrogen atom of said hydrocarbon.

13. A process according to claim 12 in which the hydrocarbon is a monoolefin.

14. A process according to claim 12 in which the hydrocarbon is a diolefin.

15. A process according to claim 12 in which the pressure is substantially atmospheric and the nitric acid is added to the hydrocarbon at a substantially uniform rate throughout a period between about five minutes and about four hours.

CLARENCE S. COE.
THOMAS F. DOUMANI.

REFERENCES CITED

The following references are of record in the file of this patent:

UNITED STATES PATENTS

| Number | Name | Date |
| --- | --- | --- |
| 1,305,790 | Forrest et al. | June 3, 1919 |
| 2,160,133 | Ellis | May 30, 1939 |
| 2,224,723 | Ellis | Dec. 10, 1940 |
| 2,335,384 | Bousquet et al. | Nov. 30, 1943 |

OTHER REFERENCES

Haitinger, "Liebigs Annalen," vol. 193 (1878), page 382.

Haitinger, "Monatschefte fur Chemie," vol. 2 (1881), pages 286–287.

Neber et al., "Berichte deutsche Chem. Gesell," vol. 59 (1926), page 2144.